Patented June 13, 1950

2,511,802

UNITED STATES PATENT OFFICE 2,511,802

SYNERGISTIC ANTIOXIDANT

Lloyd A. Hall, Chicago, Ill., assignor to The Griffith Laboratories, Inc., a corporation of Illinois No Drawing. Application September 11, 1946,
Serial No. 696,339

8 Claims. (Cl. 99—163)

This invention relates to a non-toxic antioxidant for use in food materials and, particularly, fatty substances, and is characterized by the presence of an organic acid, particularly of the class consisting of benzoic, fumaric, tartaric and citric; together with a gallic or ascorbyl ester. These are used for stabilizing such food substances as lard, oleo oil, butter, peanut butter, mayonnaise, cheese spreads, vegetable oils, fish oils, hydrogenated fats, milk powders, egg powder, sausage, bacon, oil soluble vitamins, chocolate cocoa, cocoa butter, coconut fats, essential oils, margarine, lanolin and other fatty food products or food products containing large amounts of fatty matter which are subject to rancidity development.

The invention is further characterized by the action of small amounts of two or more materials which, when used together, exert a synergistic antioxidant action—i. e., an anti-oxygenic effect greater than the sum of the anti-oxygenic effects, if any, of the individual materials when used separately.

Oils and fats often become rancid, which in the case of otherwise edible products, renders them unfit for human consumption. Some of the constituents of oils and fats are known to possess the tendency to absorb or react with oxygen. Thus, rancidity development results primarily from the products formed during oxidation. The dissolved or absorbed oxygen usually reacts first to form peroxides and the development of peroxides may be further accelerated by moisture, heat, light or catalyst. Aldehydes, ketones, and acids of lower molecular weight may be formed in the further decomposition and these materials also impart an undesirable odor or taste to the oil, fat or food product. The evaluation of rancidity is carried out by what is referred to as the active oxygen method (A. O. M.). It pertains to the amount of peroxides developed per kilogram of fat under standard conditions of acceleration. This test is also sometimes called the Swift stability test. Figures greater than those for the control indicate antioxidant value.

A great deal of work has been done on antioxidants for use in food products and particularly in animal fats such as lard. Some of the suggested materials have been highly successful, but extremely expensive. Some of the most effective materials have had to be incorporated in a volatile solvent, the removal of which is expensive and cannot be accomplished at most small rendering plants. Some of the suggested products have been toxic and unfit for use in food. The use of vegetable oils in antioxidant preparations has been suggested, but it has been necessary to use these oils in such quantity as to seriously lower the melting point of the lard mixtures. The compositions herein described may be employed to extend the keeping time and preserve fats and oils and other food materials.

The following examples are illustrative of the invention in comparison with other mixtures:

| Example | Antioxidant and Composition | | Per Cent in Lard | AOM Hours at 208° F. |
|---|---|---|---|---|
| | Control Lard | | | 2½ |
| 1 | Propyl Gallate | | 0.0100 | 25 |
| 2 | Propyl Gallate | | 0.0100 | 26 |
| | Benzoic Acid | | 0.0100 | |
| | | | 0.0200 | |
| 3 | Propyl Gallate | | 0.0100 | 48¼ |
| | Citric Acid | | 0.0100 | |
| | | | 0.0200 | |
| 4 | Butyl Tyrosine | 30.00% | 0.0030 | 15½ |
| | Propyl Gallate | 60.00% | 0.0060 | |
| | Fumaric Acid | 10.00% | 0.0010 | |
| | | 100.00% | 0.010 | |
| 5 | Butyl Tyrosine | 33.00% | 0.0033 | 20 |
| | Propyl Gallate | 65.00% | 0.0065 | |
| | Fumaric Acid | 2.00% | 0.0002 | |
| | | 100.00% | 0.010 | |
| 6 | Glycine | 35.00% | 0.0035 | 37 |
| | Propyl Gallate | 65.00% | 0.0065 | |
| | Citric Acid | 100.00% | 0.0100 | |
| | | | 0.0100 | |
| | | | 0.0200 | |

The examples given are crystalline powders. My antioxidant compositions are used in the oil or fat to be stabilized by mixing into same at 140° F. to 240° F. in the amount of from 0.01% to 0.175% as noted in the examples. None of my antioxidant compositions impart odor, taste, or color to the stabilized fat, oil, or food product in which they are used. Toxicity studies have proven their non-toxic qualities.

The gallic acid esters include methyl, ethyl, propyl and butyl gallate; but propyl gallate is preferred. The alkyl esters should include only a small number of carbon atoms. The ascorbyl ester is preferably ascorbyl palmitate or other ester of a higher fatty acid.

The foregoing detailed description is given for clearness of understanding only, and no unnecessary limitations should be understood therefrom, for some modifications will be obvious to those skilled in the art.

I claim:

1. An antioxidant composition comprising an organic acid of the class consisting of benzoic, fumaric, tartaric and citric, and an ester of the class consisting of low molecular weight alkyl esters of gallic acid and ascorbyl esters, the proportion of the acid being 3 to 50% of the total of the acid and ester and the proportion of the ester being 97 to 50% of the total of the acid and ester, and in which the total of the respective proportions are such as to give a synergistic effect in said antioxidant composition.

2. The antioxidant composition of claim 1 wherein the acid is citric acid and the ester is propyl gallate.

3. The antioxidant composition of claim 1 wherein the acid is benzoic acid and the ester is propyl gallate.

4. The antioxidant composition of claim 1 wherein the acid is citric acid and the ester is propyl gallate and wherein the citric acid and propyl gallate are in approximately equal parts.

5. The antioxidant composition of claim 1 wherein the acid is benzoic acid and the ester is propyl gallate and wherein the benzoic acid and propyl gallate are in approximately equal parts.

6. A fatty composition containing from 0.01 to 0.175% of an antioxidant comprising propyl gallate and an organic acid of the class consisting of benzoic, fumaric, tartaric, and citric, the proportion of the propyl gallate being 97 to 50% of the total of the acid and propyl gallate and the proportion of the acid being 3 to 50% of the total of the acid and propyl gallate, and in which the total of the respective proportions are such as to give a synergistic effect in said antioxidant composition.

7. A fatty composition containing from 0.01 to 0.175% of an antioxidant comprising a low molecular weight alkyl ester of gallic acid and an organic acid of the class consisting of benzoic, fumaric, tartaric and citric, the proportion of the acid being 3 to 50% of the total of the acid and ester and the proportion of the ester being 97 to 50% of the total of the acid and ester, and in which the total of the respective proportions are such as to give a synergistic effect in said antioxidant composition.

8. The composition of claim 6 wherein the organic acid is citric acid.

LLOYD A. HALL.

REFERENCES CITED

The following references are of record in the file of this patent:

UNITED STATES PATENTS

| Number | Name | Date |
|---|---|---|
| 2,444,307 | Penn | June 29, 1948 |

OTHER REFERENCES

Mattill: Oil and Soap, Jan. 1945 pp. 1–3.
Riemenschneider et al.: Oil and Soap, Oct. 1944, pages 307–309.